United States Patent
Watanabe

(10) Patent No.: US 12,327,427 B2
(45) Date of Patent: Jun. 10, 2025

(54) IMAGE PROCESSING DEVICE, CONTROL METHOD THEREOF, IMAGING DEVICE, AND PROGRAM STORAGE MEDIUM THAT DETERMINE A REGION OF AN IMAGE INCLUDING DETECTED FIRST AND SECOND REGIONS TO BE A TARGET SUBJECT REGION

(71) Applicant: CANON KABUSHIKI KAISHA, Tokyo (JP)

(72) Inventor: Kentaro Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 531 days.

(21) Appl. No.: 17/671,086

(22) Filed: Feb. 14, 2022

(65) Prior Publication Data

US 2022/0270399 A1  Aug. 25, 2022

(30) Foreign Application Priority Data

Feb. 24, 2021 (JP) .................................. 2021-026990

(51) Int. Cl.
G06V 10/20 (2022.01)
G06V 10/25 (2022.01)
G06V 40/16 (2022.01)

(52) U.S. Cl.
CPC ............ *G06V 40/165* (2022.01); *G06V 10/25* (2022.01); *G06V 10/255* (2022.01); *G06V 40/166* (2022.01)

(58) Field of Classification Search
None
See application file for complete search history.

(56) References Cited

U.S. PATENT DOCUMENTS 8,842,213 B2     9/2014 Tomita et al.
2013/0215319 A1*  8/2013 Tomita ................. G06V 10/245
                                              382/218

(Continued)

FOREIGN PATENT DOCUMENTS

JP    2009081714 A    4/2009
JP    2010-257451 A   11/2010

(Continued)

OTHER PUBLICATIONS

Japanese Office Action issued Mar. 7, 2023, in corresponding Japanese Patent Application No. 2021-026990.

(Continued)

*Primary Examiner* — Idowu O Osifade
(74) *Attorney, Agent, or Firm* — Venable LLP

(57) ABSTRACT

An image processing device that determines a target subject region to be processed from an image for a specific subject. The device includes at least one processor and at least one memory functioning as a first detection unit configured to detect a first region corresponding to a part having a first feature of the specific subject from the image, a second detection unit configured to detect a second region corresponding to a part having a second feature of the specific subject from the image, an association unit configured to associate the first region detected by the first detection unit and the second region detected by the second detection unit, and a determination unit configured to determine any region of the image including the first region detected by the first detection unit and the second region detected by the second detection unit as the target subject region.

14 Claims, 10 Drawing Sheets

(56) References Cited

U.S. PATENT DOCUMENTS

| | | | | |
|---|---|---|---|---|
| 2014/0168479 A1* | 6/2014 | Ishii | .................... | H04N 23/611 |
| | | | | 348/241 |
| 2016/0086024 A1* | 3/2016 | Tsukamoto | ............ | G06V 40/10 |
| | | | | 382/103 |
| 2019/0147598 A1* | 5/2019 | Sawai | .................... | H04N 5/272 |
| | | | | 382/283 |

FOREIGN PATENT DOCUMENTS

| | | |
|---|---|---|
| JP | 2016-019118 A | 2/2016 |
| WO | 2012-144195 A1 | 10/2012 |
| WO | 2015/156045 A1 | 10/2015 |
| WO | 2021/010070 A1 | 1/2021 |

OTHER PUBLICATIONS

Japanese Office Action issued Oct. 11, 2022, in corresponding Japanese Patent Application No. 2021-026990 (7 pages).

* cited by examiner

IMAGE PROCESSING DEVICE, CONTROL METHOD THEREOF, IMAGING DEVICE, AND PROGRAM STORAGE MEDIUM THAT DETERMINE A REGION OF AN IMAGE INCLUDING DETECTED FIRST AND SECOND REGIONS TO BE A TARGET SUBJECT REGION

CROSS REFERENCE TO PRIORITY APPLICATION

This application claims the benefit of Japanese Patent Application No. 2021-026990, filed Feb. 24, 2021 which is hereby incorporated by reference herein in its entirety.

BACKGROUND OF THE INVENTION

Field of the Invention

The present invention relates to a technique of detecting and setting a subject from a captured image.

Description of the Related Art

An imaging device can detect a subject from an image acquired by an imaging element and focus on the subject. If the subject has a plurality of characteristic parts, each of the plurality of parts is detected. Therefore, when the detection of any of the parts fails, it is possible to increase the success rate of focusing using another part for focusing.

International Publication No. WO2012/144195 discloses a technique of detecting a person's face and whole body or upper body from an image with a low reliability threshold and detecting at least one of them again with a high reliability threshold if both are detected, to thereby improve the reliability of detection. If only one of the face or the whole body is detected, focusing is performed using either of the parts to be detected.

In International Publication No. WO2012/144195, the possibility of focusing on a person increases, but whether the face that is a target for which focusing should be prioritized is in focus depends on the accuracy of detection of each subject.

SUMMARY OF THE INVENTION

According to an embodiment, the present invention, provides an image processing device comprising at least one processor and at least one memory functioning as a first detection unit configured to detect a first region corresponding to a first part of a subject from a captured image, a second detection unit configured to detect a second region corresponding to a second part of the subject from the image, an association unit configured to associate the detected first region with the detected second region, and a determination unit configured to determine a target subject to be processed from the detected first or second region, to hold information on the determined target subject, and to determine a next target subject using the information. The determination unit newly determines a subject corresponding to the second region as a target subject to be processed if the target subject determined previously is a subject corresponding to the first region, the first region is not detected in a next detection process by the first detection unit, and the second region associated with the first region is detected by the second detection unit.

Further features of the present invention will become apparent from the following description of exemplary embodiments with reference to the attached drawings.

DESCRIPTION OF THE EMBODIMENTS

Hereafter, an embodiment of the present invention will be described in detail with reference to the accompanying drawings. In the embodiment, as an example to which an image processing device according to the present invention is applied, an imaging device including a detection unit configured to detect the eye, head, and trunk of a person in an image and an automatic focusing (AF) processing unit configured to focus on a designated region is shown.

Compared with the face, head, and eye, which are specific parts of a person, the characteristics of the whole body or trunk of the person change greatly depending on the posture, clothes, or the like, and, thus, the difficulty of detection thereof is high. In addition, a focus position expected by a user, when an image of a person is captured, is often within the region of the person's face or head. For this reason, focusing using the whole body or the trunk region tends to have a relatively low value as a main subject. Therefore, the present invention is characterized in that a subject detection process is performed so that a subject to be prioritized as a main subject is detected.

Example 1

Figure 1:
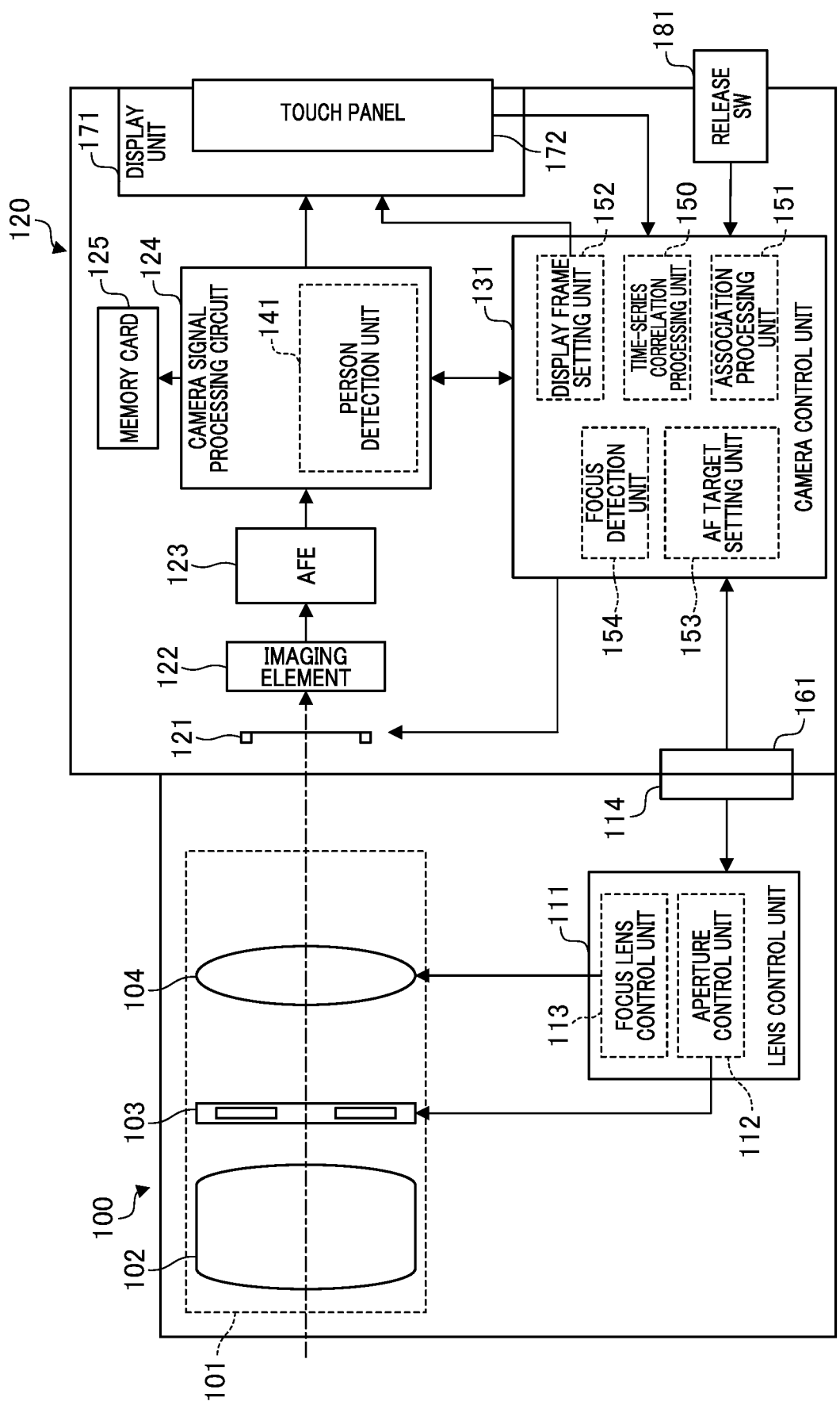
FIG. 1 is a diagram illustrating a configuration of an imaging device in an embodiment of the present invention.

FIG. 1 is a diagram illustrating a configuration example of an imaging device according to the present example. A configuration example of a mirrorless camera equipped with an eye AF function is shown. An interchangeable lens 100 is one optical instrument that can be attached to a main body 120 of the imaging device. An imaging lens unit 101 of the interchangeable lens 100 includes a main imaging optical system 102, an aperture 103 that adjusts the amount of light, and a focus lens group 104 that performs focus adjustment.

A microcomputer for lens system control (hereafter referred to as a lens control unit) 111 controls the interchangeable lens 100. An aperture control unit 112 controls an operation of the aperture 103, and a focus lens control unit 113 controls an operation of the focus lens group 104. For example, the focus lens control unit 113 controls the focus adjustment of an imaging optical system by driving the focus lens group 104 in the optical axis direction of the imaging lens unit 101 on the basis of focus lens driving information acquired from the main body 120. Meanwhile, the focus lens group 104 may have a plurality of focus lenses or may have only one focus lens. In FIG. 1, a single focus lens is shown as an example of an interchangeable lens for the purpose of simplifying the illustration, but a lens (zoom lens) of which the focal length can be changed may be used. In that case, the lens control unit 111 acquires focal length information from an encoder output for detecting the position of the zoom lens. In addition, in the case of the interchangeable lens having a camera-shake correction function, the lens control unit 111 controls a shift lens group for image shake correction.

The main body 120 includes a shutter 121 used for exposure control and an imaging element 122 such as a complementary metal oxide semiconductor (CMOS) sensor. An imaging signal that is output by the imaging element 122 is processed by an analog signal processing circuit 123 and then is transmitted to a camera signal processing circuit 124. A microcomputer for camera system control (hereafter referred to as a camera control unit) 131 controls the entire imaging device. For example, the camera control unit 131 controls a motor for shutter driving (not shown) and controls driving of the shutter 121.

A memory card 125 is a recording medium for recording data of captured images, and the like. The camera control unit 131 performs a process of recording data of captured images in the memory card 125 on the basis of the pressed state of a release switch 181, which is operated by a photographer.

An image display unit 171 includes a display device such as a liquid crystal panel (LCD). The image display unit 171 performs monitor display of an image that is attempted to be captured with a camera by a photographer or a display of a captured image. A touch panel 172 is an operation unit that is used when a photographer designates coordinates in the image display unit 171 using his/her finger, a touch pen, or the like, and can be formed integrally with the image display unit 171. For example, there is a built-in type (in-cell type) device in which the touch panel 172 is configured so that its light transmittance does not interfere with display of the image display unit 171 and is incorporated inside the display surface of the image display unit 171. The input coordinates on the touch panel 172 and the display coordinates on the image display unit 171 are associated with each other. This makes it possible to configure a graphical user interface (GUI) as if a user could directly operate a screen displayed on the image display unit 171. The operation state of the touch panel 172 is managed by the camera control unit 131.

The main body 120 includes a mount contact portion 161, which is a communication terminal for communicating with the interchangeable lens 100 on the mount surface with the interchangeable lens 100. On the other hand, the interchangeable lens 100 includes a mount contact portion 114, which is a communication terminal for communicating with the main body 120 on the mount surface with the main body 120.

The lens control unit 111 and the camera control unit 131 can perform serial communication at predetermined timings through the mount contact portions 114 and 161. Through this communication, focus lens driving information, aperture driving information, or the like, is sent from the camera control unit 131 to the lens control unit 111, and optical information, such as a focal length, is sent from the lens control unit 111 to the camera control unit 131.

The camera signal processing circuit 124 acquires a signal from the analog signal processing circuit 123 to perform signal processing. The camera signal processing circuit 124 includes a person detection unit 141. The person detection unit 141 detects a plurality of parts of a person from an image and outputs detection information. The person detection unit 141 will be described in detail in FIG. 2. The person detection result of the person detection unit 141 is sent to the camera control unit 131.

The camera control unit 131 includes a time-series correlation processing unit 150, an association processing unit 151, a display frame setting unit 152, an AF target setting unit 153, and a focus detection unit 154. Each unit is realized by a central processing unit (CPU) included in the camera control unit 131 executing a program.

The time-series correlation processing unit 150 compares the detection result before and after, and determines whether the same target is detected. The association processing unit 151 performs an association process for each part of a person included in the person detection result from the person detection unit 141.

The display frame setting unit 152 sets a detection frame for displaying on the image display unit 171. The AF target setting unit 153 notifies the focus detection unit 154 of a subject (also referred to as a target subject) for which AF control is to be performed corresponding to a designated region. The display frame setting unit 152 and the AF target setting unit 153 operate on the basis of the output of the person detection unit 141.

The focus detection unit 154 performs a focus detection process on the basis of an image signal corresponding to a focusing target subject, which is notified of by the AF target setting unit 153. The focus detection process is executed by, for example, a phase difference detection method, a contrast detection method, or the like. In the case of the phase difference detection method, the amount of image shift is calculated by the correlation calculation of a pair of image signals having a parallax. A process of further converting the amount of image shift into a defocus amount is performed. The defocus amount can be further converted into a focus lens driving amount by considering the sensitivity, or the like, of the interchangeable lens 100 during lens driving. In addition, in the case of the contrast detection method, a focus state detection process is performed on the basis of information on the contrast evaluation of a captured image.

The camera control unit 131 transmits the focus detection result (the amount of image shift or defocus amount) detected by the focus detection unit 154 or the focus lens driving amount calculated on the basis of the focus detection result to the lens control unit 111. The focus lens control unit 113 controls driving of the focus lens on the basis of the focus lens driving information acquired from the camera control unit 131. In other words, the camera control unit 131 controls driving of the focus lens through the focus lens control unit 113.

Figure 2:
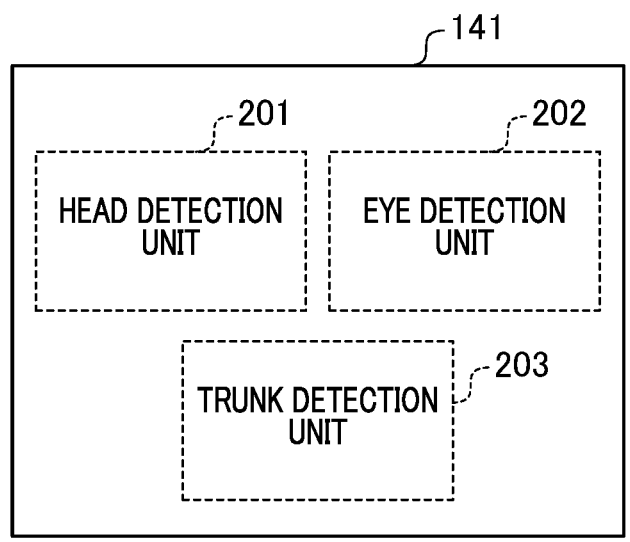
FIG. 2 is a diagram illustrating a configuration of a person detection unit in the present embodiment.

The configuration of the person detection unit 141 will be described with reference to FIG. 2. FIG. 2 is a block diagram illustrating a configuration example of the person detection unit 141. The person detection unit 141 includes a head detection unit 201, an eye detection unit 202, and a trunk detection unit 203.

The head detection unit 201 detects the head region of a person from a captured image. For head detection, a known method, such as a method based on the result of detecting a characteristic edge or pattern, or a method based on an algorithm, in which a face region is learned by machine learning, can be used. The eye detection unit 202 detects an eye from the captured image on the basis of the head region, which is output by the head detection unit 201. For eye detection, a known method, such as a method based on pattern matching, or a method based on an algorithm, in which an eye region is learned by machine learning, can be used.

The trunk detection unit 203 detects a trunk region from the captured image. In the present embodiment, the trunk region is a rectangular region that includes a trunk portion below the neck of the human body and above the waist, and does not include the arms. Similar to the head detection unit 201 and the eye detection unit 202, for trunk detection, a known method, such as a method based on pattern matching, or a method based on an algorithm, in which the trunk region is learned by machine learning, can be used. The trunk region is not limited to the above definition, and may be defined as a region including at least a portion of parts other than the head or the face in the region of a subject.

Figure 3:
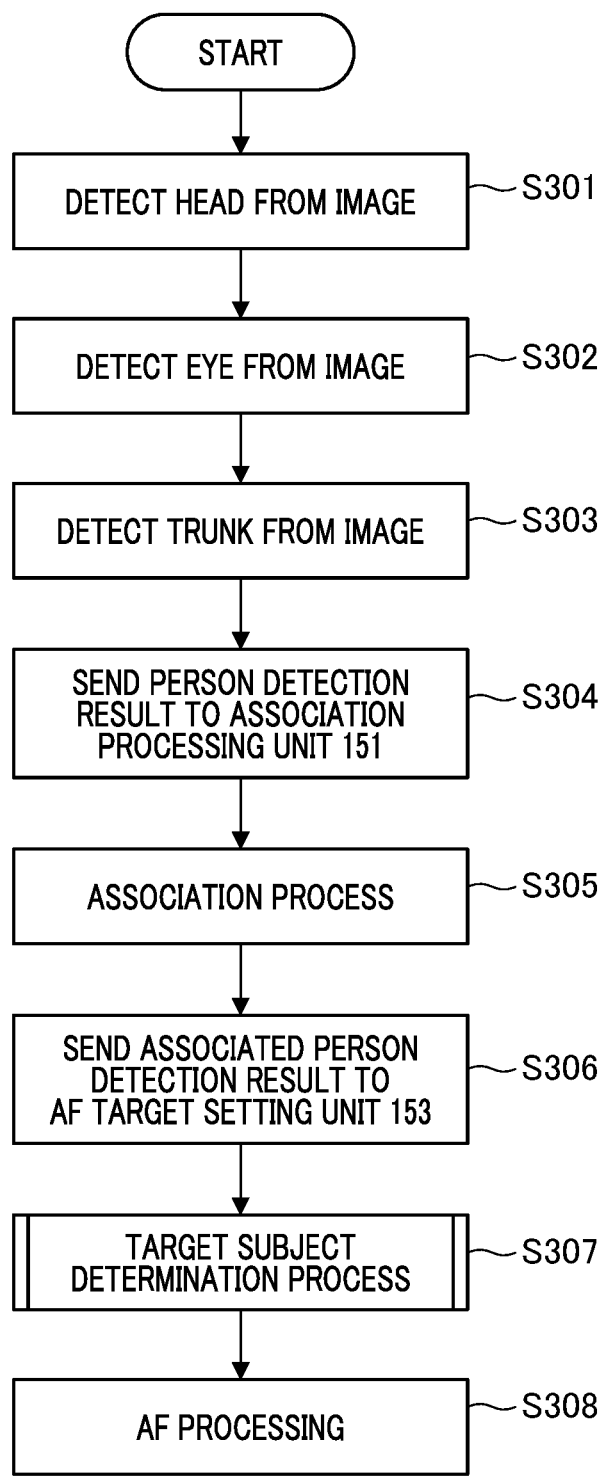
FIG. 3 is a flowchart illustrating an overall operation in Example 1.

A process of determining a target subject will be described with reference to FIGS. 3 to 7. FIG. 3 is a flowchart illustrating an overall operation after the person detection unit 141 detects a person and before the camera control unit 131 performs AF control.

In S301 of FIG. 3, the head detection unit 201 performs head detection from the captured image, and the process proceeds to S302. In S302, the eye detection unit 202 performs eye detection using the captured image and the head detection result acquired in S301. In this case, if the head detection result is not acquired in S301, the eye detection is not performed, and the process proceeds to S303.

In S303, after S302, the trunk detection unit 203 performs trunk detection from the captured image, and the process proceeds to S304. In S304, the person detection unit 141 combines the detection results obtained in S301, S302, and S303 as the person detection result. Information on this person detection result is sent to the association processing unit 151. In this case, if no detection result is obtained in the detection in S301, S302, and S303, information on an empty person detection result is sent to the association processing unit 151, and the process proceeds to S305.

In S305, the association processing unit 151 performs a process of associating a pair of an eye and a head, and a pair of a head and a trunk determined to belong to the same subject. In this case, the head associated with the eye of the same subject may be associated with the trunk. For example, there is a method of comparing the detection coordinates with each other in the association process and determining that a pair of which the distance is closer than a predetermined distance (threshold) is related. In addition, there is a method of using an algorithm learned to output the degree of relevance of each detection result through machine learning. A plurality of known methods may be combined and processed so as to improve the accuracy of association. Next, the process proceeds to S306.

In S306, the association processing unit 151 generates information in which the association result acquired in S305 is imparted to the person detection result and sends the information to the AF target setting unit 153. Next, in S307, the AF target setting unit 153 performs a target subject determination process using the person detection result to which the association result is imparted. The detailed content of a process of determining a target subject, which is a process target, will be described later. In S308, AF processing is performed using information on the set target subject and the target part.

Figure 4:
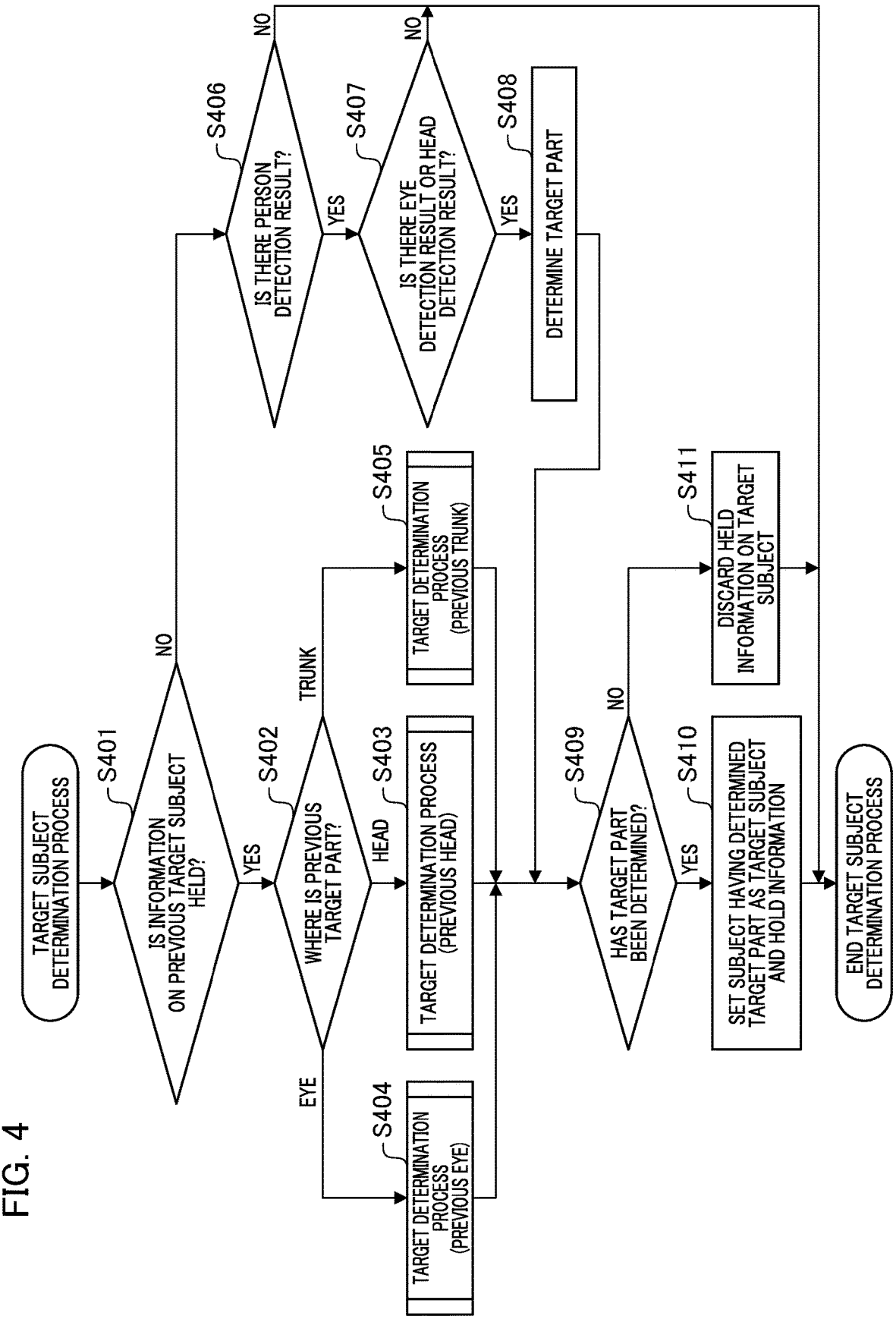
FIG. 4 is a flowchart of an automatic focusing (AF) target subject determination process in Example 1.

FIG. 4 is a flowchart illustrating a target subject setting process that is performed by the AF target setting unit 153 in S307 of FIG. 3. In S401, the AF target setting unit 153 determines whether information on the previous target subject is held. The information on the previous target subject is information on a target subject selected in the previous AF processing, and a target part, coordinates, and the like, are stored in a memory. If the target subject is not set in the previous AF processing, the information on the previous target subject is not held. If the information on the previous target subject is held in S401, the process proceeds to S402, and, if the information on the previous target subject is not held, the process proceeds to S406.

In S402, a process of determining the previous target part is executed from the held information on a target subject. The process proceeds to S403 if the previous target part is determined to be the head, the process proceeds to S404 if it is determined to be the eye, and the process proceeds to S405 if it is determined to be the trunk.

In S403, the target part determination process, in a case when the previous target part is the head, is executed. In S404, the target part determination process, in a case when the previous target part is the eye, is executed. In S405, the target part determination process, in a case when the previous target part is the trunk, is executed. The detailed process content of S403 to S405 will be described later. After S403 to S405, the process proceeds to S409.

In S406, the AF target setting unit 153 determines the presence or the absence of the person detection result. If it is determined that there is a detected part, the process proceeds to S407. If it is determined that there is no detected part, the target subject determination process is interrupted and the target subject determination process is ended.

In S407, the AF target setting unit 153 determines whether there is an eye detection result or a head detection result in the person detection result. If it is determined that there is an eye detection result or a head detection result, the process proceeds to S408. If it is determined that there is no eye detection result or head detection result, the target subject determination process is interrupted and the target subject determination process is ended. For example, even if there is a trunk detection result in the person detection result, the target subject determination process is ended.

In S408, the target part is determined. If there is an eye detection result, the AF target setting unit 153 sets the eye as the target part, and, if there is no eye detection result, the AF target setting unit sets the head as the target part. Then, the process proceeds to S409. In S409, the AF target setting unit 153 determines whether the target part has been determined. If the target part is determined, the process proceeds to S410, and, if the target part is not determined, the process proceeds to S411.

In S410, the AF target setting unit 153 sets a subject having the determined target part as the target subject and holds information on the target subject. In addition, in S411, the AF target setting unit 153 discards the held information on the target subject. In this case, the target subject is not set. After S410 and S411, the target subject determination process is ended.

Figure 5:
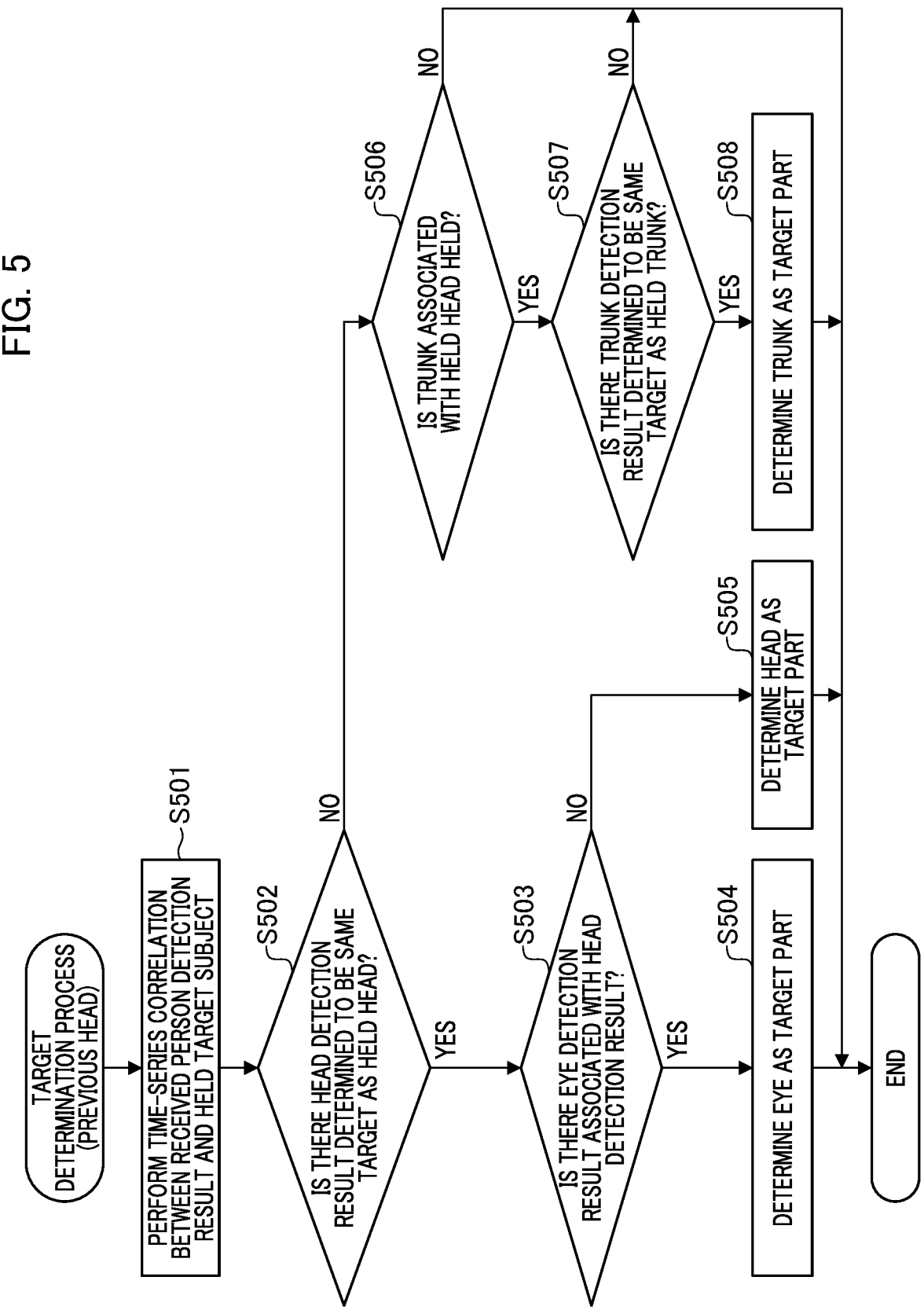
FIG. 5 is a flowchart of a target determination process (previous head) of FIG. 4.
Figure 6:
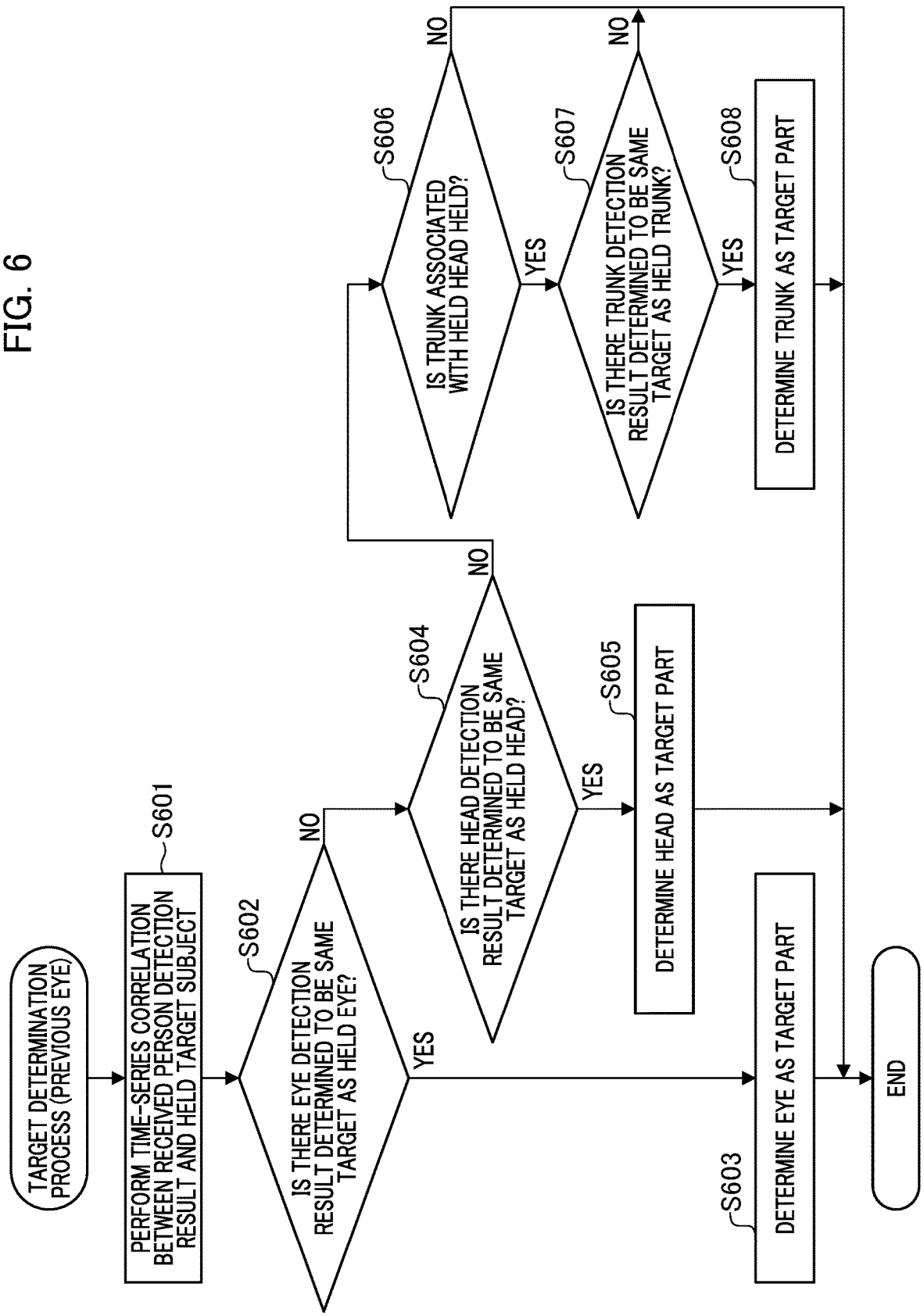
FIG. 6 is a flowchart of a target determination process (previous eye) of FIG. 4.

The process content of S403, S404, and S405 of FIG. 4 will be described with reference to FIGS. 5 to 7. FIG. 5 is a flowchart illustrating a target determination process (S403) in a case when the detection part (target part) used when AF is performed on the previous target subject is the head. FIG. 6 is a flowchart illustrating a target determination process (S404) in a case when the previous target part is the eye.

Figure 7:
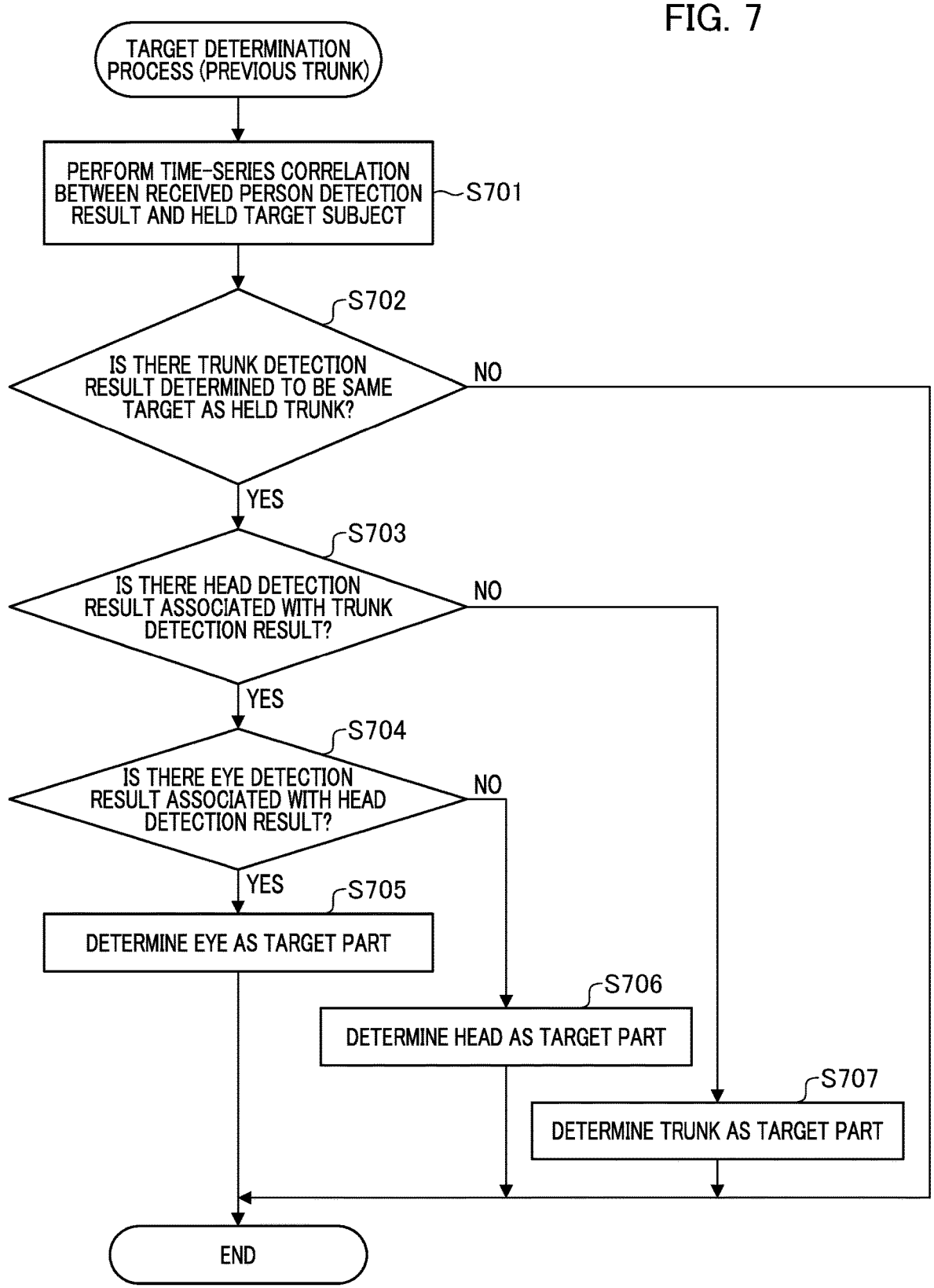
FIG. 7 is a flowchart of a target determination process (previous trunk) of FIG. 4.

FIG. 7 is a flowchart illustrating a target determination process (S405) in a case when the previous target part is the trunk.

In S501 of FIG. 5, the time-series correlation processing unit 150 performs a time-series correlation process between each part of the received person detection result and each part of the held target subject. The time-series correlation process is a process of comparing the previous detection result or the information on the target subject with a certain detection result and determining whether they indicate the same subject or a part of the subject. In the time-series correlation process, for example, there is a method of determining that the detection result is the same subject or a part of the subject if positions in the images of the comparison results are closer than a predetermined range. In addition, there is a method, or the like, of determining that the detection result is the same subject or a part of the subject if it is recognized that the features are close to each other using template matching. Known methods may be used in combination.

In S502 after S501, the AF target setting unit 153 determines whether there is a head detection result determined to be the same target as the head of the held target subject. If it is determined that there is the head detection result, the process proceeds to S503, and, if it is determined that there is no head detection result, the process proceeds to S506.

In S503, the AF target setting unit 153 determines whether there is an eye detection result associated with the head detection result. If it is determined that there is the eye detection result, the process proceeds to S504, and, if it is determined that there is no eye detection result, the process proceeds to S505. In S504, a process of determining the eye as the target part is executed, and a process of determining the target part is ended. In S505, a process of determining the head as the target part is executed, and the process of determining the target part is ended.

In addition, if the process proceeds from S502 to S506, in S506, the AF target setting unit 153 determines whether information on the trunk associated with the head of the held target subject is held. If it is determined that the information on the trunk is held, the process proceeds to S507, and, if it is determined that the information on the trunk is not held, the process of determining the target part is ended.

In S507, the AF target setting unit 153 determines whether there is a trunk detection result determined to be the same target as the trunk of the held target subject. If it is determined that there is the trunk detection result, the process proceeds to S508, and, if it is determined that there is no trunk detection result, the process of determining the target part is ended. In S508, the AF target setting unit 153 determines the trunk as the target part, and the process of determining the target part is ended.

Next, the detailed content of the target determination process (FIG. 4: S404) will be described with reference to FIG. 6. In S601, the time-series correlation processing unit 150 performs the time-series correlation process similarly to S501 of FIG. 5, and the process proceeds to S602.

In S602, the AF target setting unit 153 determines whether there is an eye detection result determined to be the same target as the eye of the held target subject. If it is determined that there is the eye detection result, the process proceeds to S603, and, if it is determined that there is no eye detection result, the process proceeds to S604. In S603, the process of determining the eye as the target part is executed, and the process of determining the target part is ended.

In S604, the AF target setting unit 153 determines whether there is a head detection result determined to be the same target as the head of the held target subject. If it is determined that there is the head detection result, the process proceeds to S605, and, if it is determined that there is no head detection result, the process proceeds to S606. In S605, the process of determining the head as the target part is executed, and the process of determining the target part is ended.

In S606, the AF target setting unit 153 determines whether the information on the trunk associated with the head of the held target subject is held. If it is determined that the information on the trunk is held, the process proceeds to S607, and, if it is determined that the information on the trunk is not held, the process of determining the target part is ended.

In S607, the AF target setting unit 153 determines whether there is a trunk detection result determined to be the same target as the trunk of the held target subject. If it is determined that there is the trunk detection result, the process proceeds to S608, and, if it is determined that there is no trunk detection result, the process of determining the target part is ended. In S608, a process of determining the trunk as the target part is executed, and the process of determining the target part is ended.

The detailed content of the target determination process (FIG. 4: S405) will be described with reference to FIG. 7. In S701, the time-series correlation processing unit 150 performs the time-series correlation process similarly to S501 of FIG. 5, and the process proceeds to S702. In S702, the AF target setting unit 153 determines whether there is a trunk detection result determined to be the same target as the trunk of the held target subject. If it is determined that there is the trunk detection result, the process proceeds to S703, and, if it is determined that there is no trunk detection result, the process of determining the target part is ended.

In S703, the AF target setting unit 153 determines whether there is a head detection result associated with the trunk detection result. If it is determined that there is the head detection result, the process proceeds to S704, and, if it is determined that there is no head detection result, the process proceeds to S707. In S704, the AF target setting unit 153 determines whether there is an eye detection result associated with the head detection result. If it is determined that there is the eye detection result, the process proceeds to S705, and, if it is determined that there is no eye detection result, the process proceeds to S706.

In S705, the process of determining the eye as the target part is executed, and, in S706, the process of determining the head as the target part is executed. In S707, the process of determining the trunk as the target part is executed. After S705, S706, and S707, the process of determining the target part is ended.

In the present example, in the process of determining the target part, cases in which the trunk is determined as the target part are limited to the following two. The first case is a case when the head associated with the trunk determined to be the same in the time-series correlation process or the eye associated with the head is the previous target part and there is no head detection result. The second case is a case when the previous target part is the trunk and the current target part is determined to be the same as the previous trunk in the time-series correlation process. By limiting conditions, in which the trunk is set as a target of AF processing in this way, it is possible to suppress or to prevent the AF processing from being performed on a trunk that is likely to be erroneously detected or a trunk that has a low likelihood of being a main subject. In addition, in the present example, the association processing unit 151 also associates the eye and the head. For example, the eye detection result is not used if there is no head detection result, but the head is set as the target part, even if there is no eye detection result associated with the head detection result.

According to the present example, in the imaging device that detects a plurality of parts related to a subject and performs main subject recognition or AF processing, it is possible to reduce the frequency of erroneous detection of a designated part and to suppress the occurrence of main subject recognition or AF processing for a subject having a low likelihood of being a main subject.

In addition, screen control during imaging or reproduction will be described. In the present embodiment, the detected head (face), eye, and target region are displayed distinguishably from other regions. Specifically, the display frame setting unit 152 sets each region of a predetermined range, including the target region, as a display frame, and the camera control unit 131 displays it on the display unit 171. In this case, frame display of the head and the eye is performed for each of the detected regions. However, frame display of the trunk region is not performed by its detection alone, and the frame display is performed if the trunk region is set as the main subject (AF target region) in step S508 in which the head or the eye that is set as the main subject is lost. Without being limited to the above, for example, the trunk region related to the main subject may always be displayed, frame display may be performed on the trunk in which the head and the eye set as the same subject are detected, and these display modes may be able to be switched (set) depending on the mode, and the like.

Example 2

Example 2 will be described with reference to FIGS. 8 to 10. In the present example, an operation of determining whether an instruction for a user's subject designation has been performed and determining a target part will be described. In the present example, the detailed description of the same elements as those in Example 1 will be omitted, and differences therebetween will be mainly described below.

Regarding a user's subject designation, it is possible to designate coordinates by touching the touch panel 172 and to designate the coordinates of a display frame that is displayed on the image display unit 171 at a point in time when the release switch 181 is pressed. In a case when the camera control unit 131 accepts the coordinate designation, the camera control unit determines the designated subject on the basis of the designated coordinates and the person detection result, and holds information on an instruction for the subject designation in a memory.

In the processes of determining the target part in S403, S404, and S405 of FIG. 4, an operation, in a case when a process of determining whether an instruction for a user's subject designation has been performed is added will be described with reference to FIGS. 8 to 10.

Figure 8:
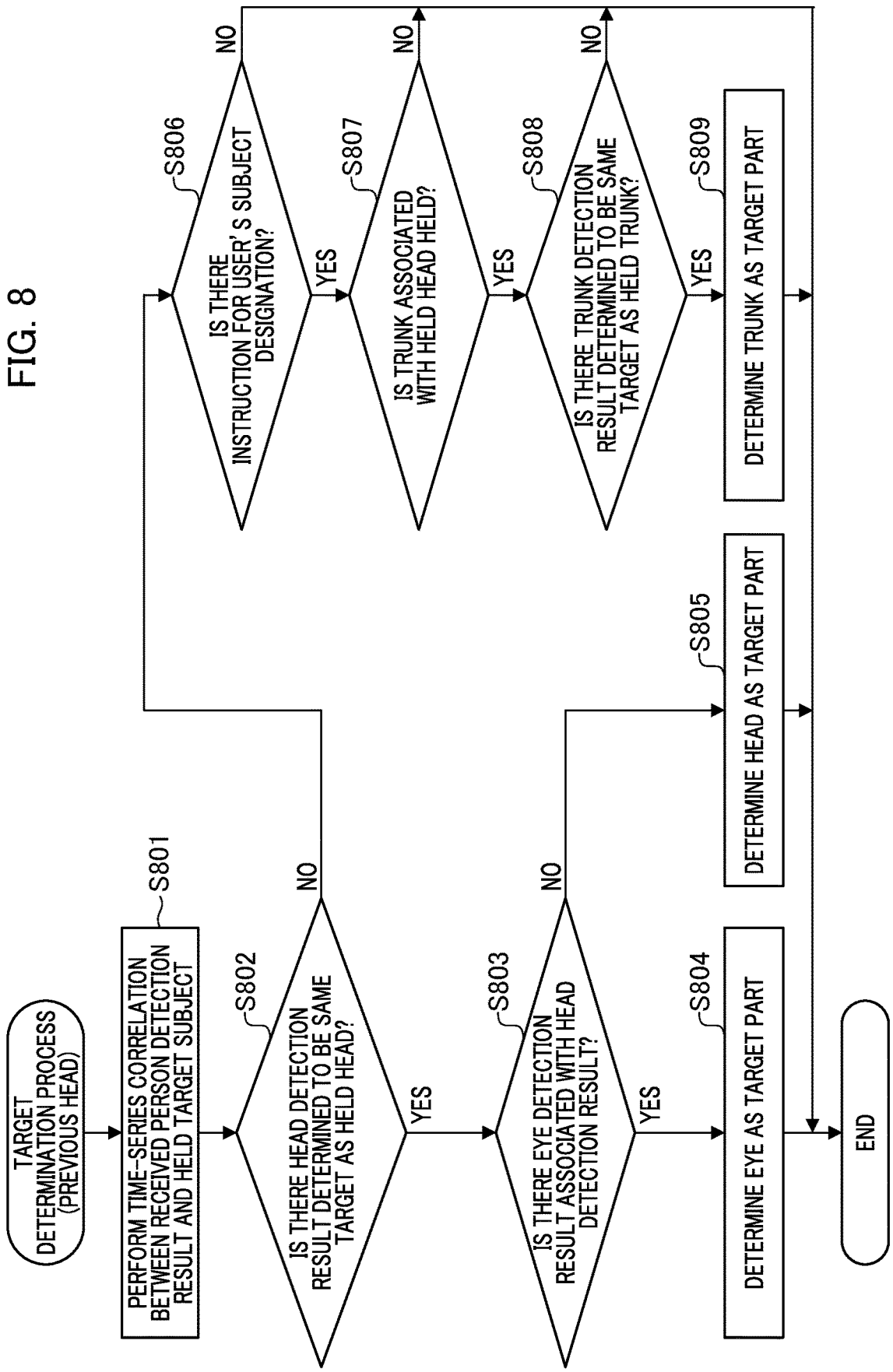
FIG. 8 is a flowchart of a target determination process (previous head) in Example 2.

FIG. 8 is a flowchart illustrating an operation in a case when a determination as to whether an instruction for a user's subject designation has been performed is added in the target determination process (previous head) of FIG. 5. The processes of S801 to S805 are the same as those of S501 to S505 of FIG. 5, respectively. In addition, the processes of S807 to S809 are the same as those of S506 to S508 of FIG. 5, respectively. The difference is that the determination process of S806 is added.

After the time-series correlation process in S801, in S802, the AF target setting unit 153 determines whether there is a head detection result determined to be the same target as the head of the held target subject. If it is determined that there is the head detection result, the processes of S803 to S805 are executed similarly to Example 1. That is, the eye or the head is determined as the target part depending on the presence or the absence of the eye detection result associated with the head detection result.

On the other hand, if it is determined in S802 that there is no head detection result determined to be the same target as the head of the held target subject, the process proceeds to S806. In S806, the AF target setting unit 153 determines whether there is an instruction for a user's subject designation. If it is determined that there is the instruction for a user's subject designation, the process proceeds to S807, and the processes of S807 to S809 are executed. If it is determined in S806 that there is no instruction for a user's subject designation, the process of determining the target part is ended.

Figure 9:
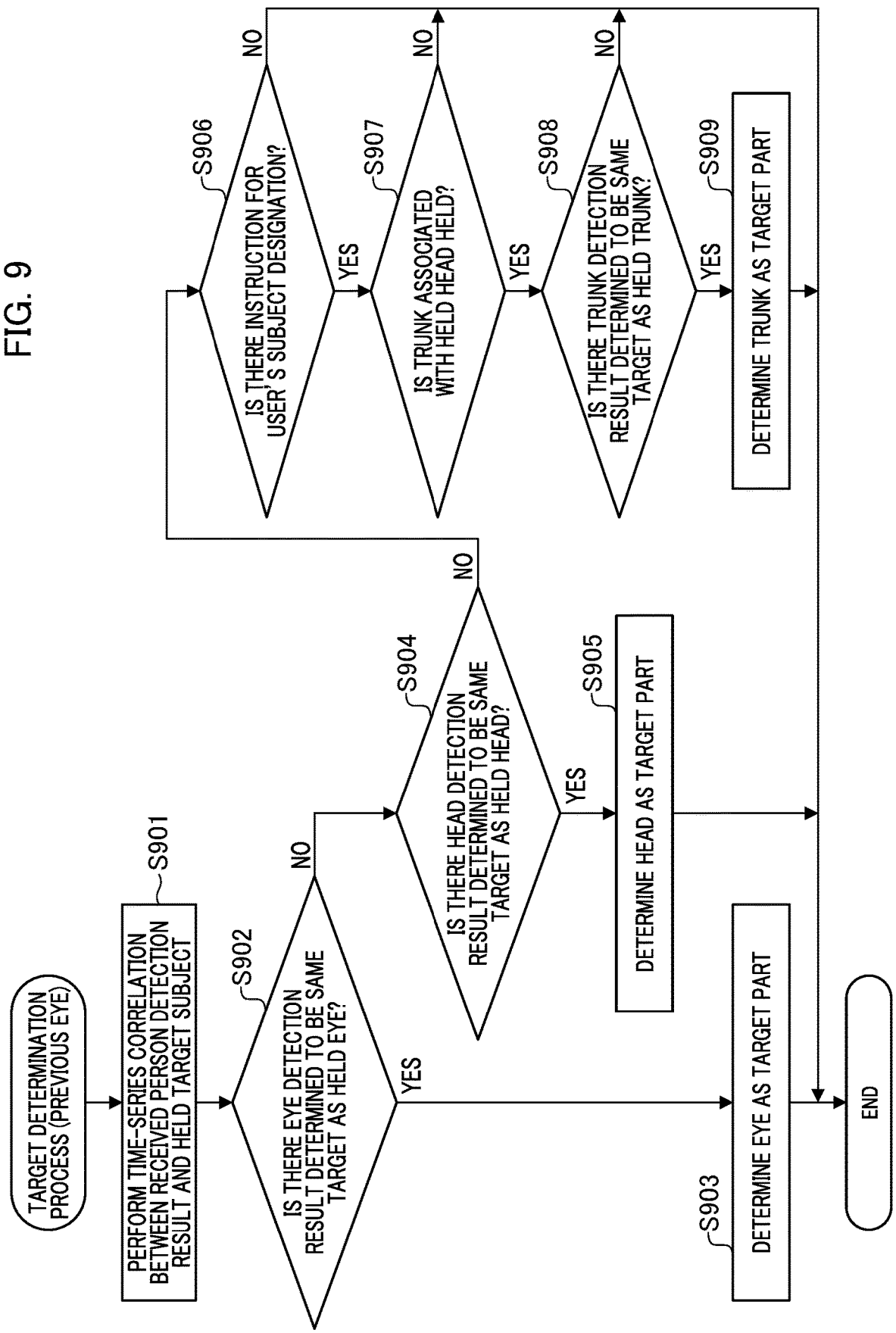
FIG. 9 is a flowchart of a target determination process (previous eye) in Example 2.

FIG. 9 is a flowchart illustrating an operation in a case when a determination as to whether the instruction for a user's subject designation has been performed is added in the target determination process (previous eye) of FIG. 6. The processes of S901 to S905 are the same as those of S601 to S605 of FIG. 6, respectively. In addition, the processes of S907 to S909 are the same as those of S606 to S608 of FIG. 6, respectively. The difference is that the determination process of S906 is added.

If the process proceeds from S902 to S904, and it is determined that there is no head detection result determined to be the same target as the head of the held target subject, the process proceeds to S906. In S906, the AF target setting unit 153 determines whether there is the instruction for a user's subject designation. If it is determined that there is the instruction for a user's subject designation, the processes of S907 to S909 are executed. If it is determined in S906 that there is no instruction for a user's subject designation, the process of determining the target part is ended.

Figure 10:
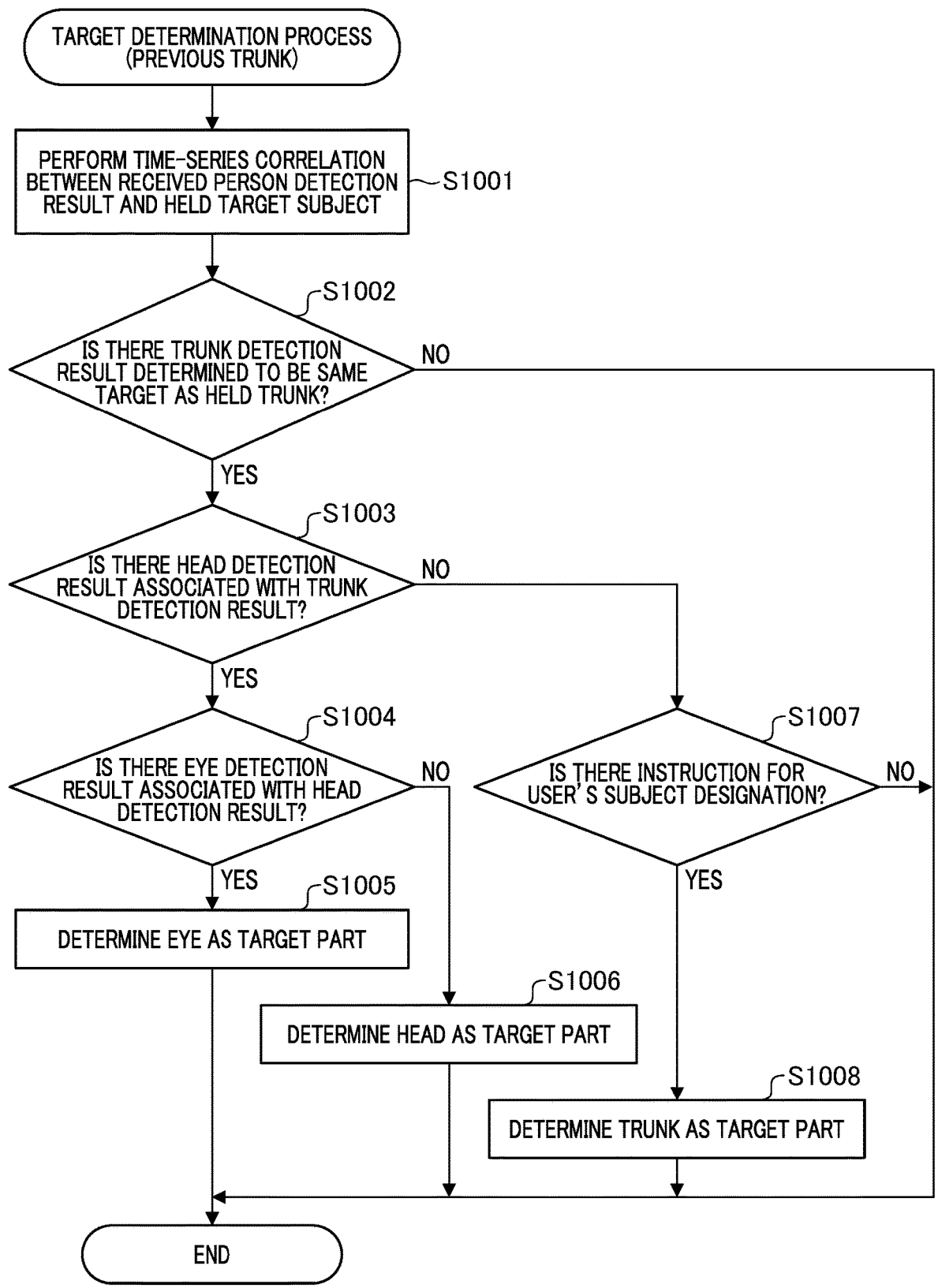
FIG. 10 is a flowchart of a target determination process (previous trunk) in Example 2.

FIG. 10 is a flowchart illustrating an operation in a case when a determination as to where the instruction for a user's subject designation has been performed is added in the target determination process (previous trunk) of FIG. 7. The processes of S1001 to S1006 are the same as those of S701 to S706 of FIG. 7. In addition, the process of S1008 is the same as that of S707 of FIG. 7. The difference is that the determination process of S1007 is added.

If it is determined in S1003 that there is no head detection result associated with the trunk detection result, the process proceeds to S1007. In S1007, the AF target setting unit 153 determines whether there is the instruction for a user's subject designation. If it is determined that there is the instruction for a user's subject designation, the process of S1008 is executed. If it is determined in S1007 that there is no instruction for a user's subject designation, the process of determining the target part is ended.

In the present example, the presence or the absence of the instruction for a user's subject designation is determined. If it is determined that there is no instruction for a user's subject designation, the trunk is not determined to be the target part. For example, in the target determination process (previous trunk) shown in S405 of FIG. 4, it is assumed that the previous target part is the trunk, and that the trunk detection result in which the current target part is determined to be the same as the previous trunk is acquired. In this case, the trunk is not determined as the target part unless there is the instruction for a user's subject designation.

The present example is effective in a state in which a plurality of persons are detected in an image. For example, unless there is the instruction for a user's subject designation, it is possible to prevent a subject in which information on the head detection result is lost from being continuously set as the target subject. It becomes easy to automatically select the target subject in which the head and the eye are detected. On the other hand, in a case when there is the instruction for a user's subject designation, the target subject is continuously set through the trunk detection, even if the information on the head detection result is lost, and, thus, focusing on a target subject of a user can be continued. According to the present example, it is possible to realize the operation of the imaging device based on the subject detection result according to the intention of a user.

In the example, conditions that are set as processing targets (target subjects) by an image processing device that detects a plurality of parts of a subject from an image and performs predetermined processing (such as AF or subject tracking) are limited. Meanwhile, since control of searching for and tracking a specific subject from a captured image is known, the detailed description thereof will be omitted.

According to the example, it is possible to suppress erroneous detection of a designated part and to reduce the frequency with which a subject having a low likelihood of being a main subject is determined as a processing target.

OTHER EXAMPLES

Although the embodiments of the present invention have been described in detail using the examples, the present invention is not limited to such specific embodiments, and various forms without departing from the scope of this invention are also included in the present invention. For example, the subject does not have to be a person, and may be an animal, such as a dog or a cat, or an inorganic matter, and is not limited to a specific target.

In addition, in the above example, the detection results of different parts have been described as being associated as a one-to-one combination in the association. The relationship of association may be one-to-many or many-to-many without being limited thereto. Further, in the case of a one-to-many or many-to-many relationship, association may be further performed in a group of multiple detection results. The detection and association of each part of a person who is a specific subject is an example. Regarding a combination of associations, different types of subjects may be used. For example, a combination of a person and an animal, or an inorganic matter may be used.

The present invention can also be realized by supplying a program for realizing one or more functions of the above-described embodiments to a system or a device through a network or a storage medium and by one or more processors in a computer of the system or device reading out and executing the program. In addition, the present invention can also be realized by a circuit (for example, an ASIC) that realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing device that determines a target subject region to be processed from an image for a specific subject, the image processing device comprising:
    at least one processor and at least one memory functioning as:
        a first detection unit configured to detect a first region corresponding to a part having a first feature of the specific subject from the image;
        a second detection unit configured to detect a second region corresponding to a part having a second feature of the specific subject from the image;
        an association unit configured to associate the first region detected by the first detection unit and the second region detected by the second detection unit; and
        a determination unit configured to determine any region of the image including the first region detected by the first detection unit and the second region detected by the second detection unit as the target subject region,
    wherein, if the first region or the second region is determined as the target subject region in a first frame, and, if the first region is not detected by the first detection unit in a second frame and the second region in the second frame corresponding to the second region in the first frame is detected by the second detection unit, the determination unit determines the second region as the target subject region in the second frame,
    wherein the second frame is an image generated by imaging at a point in time later than that of the first frame, and
    wherein, if the first region corresponding to the specific subject from which the second region is detected is not detected in either the first frame or the second frame, the determination unit does not determine the second region as the target subject region, even if the second region is detected in the second frame.

2. The image processing device according to claim 1, wherein the second region has a higher possibility of erroneous detection than the first region.

3. The image processing device according to claim 1, wherein the specific subject is a person, a part having the first feature is a head of the person, and a part having the second feature is a trunk of the person.

4. The image processing device according to claim 1, the at least one processor and the at least one memory further functioning as:
    a third detection unit configured to detect a third region corresponding to a part having a third feature of the specific subject from the image, the part having the third feature being included in a part having the first feature,
    wherein the determination unit determines the first region as the target subject region in the first frame, and, if the first region and a third region associated with the first region are detected by the first detection unit and the third detection unit in the second frame, the third region is determined as the target subject region.

5. The image processing device according to claim 4, wherein the specific subject is a person, a part having the first feature is a head of the person, and a part having the third feature is an eye of a person.

6. The image processing device according to claim 4, wherein the association unit performs a process of associating the first region and the second region belonging to the same subject or performs a process of associating the first region associated with the third region belonging to the same subject with the second region.

7. The image processing device according to claim 1, the at least one processor and the at least one memory further functioning as:
    a designation unit configured to designate the specific subject, wherein, if the target subject region determined previously is a subject region corresponding to the first region, the first region is not detected in the next detection process performed by the first detection unit, and, if the specific subject is designated by the designation unit, the determination unit determines a target subject region corresponding to the second region associated with the first region.

8. The image processing device according to claim 1, the at least one processor and the at least one memory further functioning as:
a correlation processing unit configured to perform a correlation process between an image region of a detected subject and the target subject region indicated by held information on the target subject region and to make a comparison therebetween,
wherein the determination unit determines whether the target subject region is newly determined from an output of the correlation processing unit, holds information on the determined target subject region if it is determined that the target subject region is newly determined, and performs a process of discarding the held information on the target subject region if it is determined that the target subject region is not newly determined.

9. An imaging device comprising the image processing device according to claim 1.

10. The imaging device according to claim 9, further comprising a display unit configured to display the target subject region in a manner distinguishable from a region other than the target subject region in the specific object in a captured image.

11. A method of controlling operation executed by an image processing device that determines a target subject region to be processed from an image for a specific subject, the method comprising:
causing a first detection unit to detect a first region corresponding to a part having a first feature of the specific subject from the image, and causing a second detection unit to detect a second region corresponding to a part having a second feature of the specific subject from the image;
associating the first region detected by the first detection unit with the second region detected by the second detection unit; and
causing a determination unit to determine any region of the image including the first region detected by the first detection unit and the second region detected by the second detection unit as the target subject region,
wherein, if the first region or the second region is determined as the target subject region in a first frame, and, if the first region is not detected by the first detection unit in a second frame and the second region in the second frame corresponding to the second region in the first frame is detected by the second detection unit, the determination unit determines the second region as the target subject region in the second frame,
wherein the second frame is an image generated by imaging at a point in time later than that of the first frame, and
wherein, if the first region corresponding to the specific subject from which the second region is detected is not detected in either the first frame or the second frame, the determination unit does not determine the second region as the target subject region, even if the second region is detected in the second frame.

12. The method according to claim 11, wherein the second region has a higher possibility of erroneous detection than the first region.

13. A non-transitory storage medium on which is stored a computer program for causing a computer of an image processing device the computer to execute:
causing a first detection unit to detect a first region corresponding to a part having a first feature of the specific subject from the image;
causing a second detection unit to detect a second region corresponding to a part having a second feature of the specific subject from the image;
associating the first region detected by the first detection unit and the second region detected by the second detection unit; and
determining any region of the image including the first region detected by the first detection unit and the second region detected by the second detection unit as the target subject region,
wherein, if the first region or the second region is determined as the target subject region in a first frame, and, if the first region is not detected by the first detection unit in a second frame and the second region in the second frame corresponding to the second region in the first frame is detected by the second detection unit, the determination unit determines the second region as the target subject region in the second frame,
wherein the second frame is an image generated by imaging at a point in time later than that of the first frame, and
wherein, if the first region corresponding to the specific subject from which the second region is detected is not detected in either the first frame or the second frame, the determination unit does not determine the second region as the target subject region, even if the second region is detected in the second frame.

14. The non-transitory storage medium according to claim 13, wherein the second region has a higher possibility of erroneous detection than the first region.

* * * * *